(12) United States Patent
Dutta (10) Patent No.: US 7,747,229 B2
(45) Date of Patent: Jun. 29, 2010

(54) ELECTRONIC ANTENNA BEAM STEERING USING ANCILLARY RECEIVERS AND RELATED METHODS

(75) Inventor: Santanu Dutta, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 979 days.

(21) Appl. No.: 11/281,078

(22) Filed: Nov. 17, 2005

(65) Prior Publication Data

US 2006/0111056 A1 May 25, 2006

Related U.S. Application Data

(60) Provisional application No. 60/629,794, filed on Nov. 19, 2004.

(51) Int. Cl.
*H04B 1/06* (2006.01)
(52) U.S. Cl. .................................. 455/101; 455/277.1
(58) Field of Classification Search ............. 455/562.1, 455/101, 135–138, 277.1, 277.2; 375/267, 375/347; 370/216
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |

(Continued)

FOREIGN PATENT DOCUMENTS

EP  0 506 255 A2  9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Thanh C Le
(74) *Attorney, Agent, or Firm*—Myers Bigel Sibley & Sajovec, P.A.

(57) ABSTRACT

Communications device may include a plurality of antenna elements, an ancillary control receiver, and a primary receiver. The plurality of antenna elements may provide respective fixed beams. The ancillary control receiver may be coupled to each of the antenna elements, and the ancillary control receiver may be configured to measure a signal strength from each of the antenna elements and to select one of the antenna elements responsive to the measured signal strengths. The primary receiver may be configured to receive communications using the selected antenna element. Related methods are also discussed.

53 Claims, 6 Drawing Sheets

U.S. PATENT DOCUMENTS

| | | | |
|---|---|---|---|
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,167,286 A * | 12/2000 | Ward et al. ............... 455/562.1 |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,133,698 B2 * | 11/2006 | Miyoshi et al. .......... 455/562.1 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0053414 A1 * | 3/2003 | Akahane et al. ............. 370/216 |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040659 A1 | 2/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 467 437 A1 | 6/1998 |
| EP | 1 059 826 A1 | 12/2000 |
| EP | 1 193 989 A1 | 4/2002 |
| EP | 1 294 154 A2 | 3/2003 |
| WO | WO 01/31746 | 5/2001 |
| WO | WO 01/54314 A1 | 7/2001 |
| WO | WO 03/107563 | 12/2003 |

OTHER PUBLICATIONS

Ayyagari et al., "A satellite-augmented cellular network concept", *Wireless Networks*, Vo. 4, 1998, pp. 189-198.

International Search Report for International Application No. PCT/US2005/041992 mailed May 10, 2006.

Written Opinion of the International Searching Authority for International Application No. PCT/US2005/041992, mailed May 10, 2006.

* cited by examiner

ELECTRONIC ANTENNA BEAM STEERING USING ANCILLARY RECEIVERS AND RELATED METHODS

CROSS REFERENCE TO RELATED APPLICATION

This application claims the benefit of provisional Application No. 60/629,794 filed Nov. 19, 2004, entitled Electronic Antenna Beam Steering Using Ancillary, Asynchronous, Pilot Channel Receivers, the disclosure of which is hereby incorporated herein by reference in its entirety as if set forth fully herein.

FIELD OF THE INVENTION

The present invention relates to the field of communications and more particularly, to antenna beam steering.

BACKGROUND

Satellite radioterminal communications systems and methods are widely used for radioterminal communications. Satellite radioterminal communications systems and methods generally employ at least one space-based component, such as one or more satellites that is/are configured to wirelessly communicate with a plurality of satellite radioterminals.

A satellite radioterminal communications system or method may utilize a single satellite antenna pattern (i.e., a global beam) to cover an entire area served by the system. Alternatively or in addition, in cellular satellite radioterminal communications systems and methods, multiple satellite antenna patterns (i.e., beams or cells) are provided, each of which can serve substantially distinct geographical areas in an overall service region, to collectively serve an overall satellite footprint. Thus, a cellular architecture similar to that used in conventional terrestrial cellular radioterminal systems and methods can be implemented in cellular satellite-based systems and methods. The satellite typically communicates with radioterminals over a bidirectional communications pathway, with radioterminal communication signals being communicated from the satellite to the radioterminal over a down-link, forward-link or forward service link, and from the radioterminal to the satellite over an up-link, return-link or return service link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet and/or Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal," or "wireless user device".

As is well known to those having skill in the art, terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite band spectrum may be underutilized or unutilized in such areas. The use of terrestrial retransmission of all or some of the satellite band frequencies can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., in and/or proximate to densely populated urban, industrial, and/or commercial areas. As a result, the overall system can become much more economically viable, as it may be able to serve a much larger subscriber base. Finally, satellite radioterminals for a satellite radioterminal system having a terrestrial component within the same satellite frequency band and using substantially the same air interface for both terrestrial and satellite communications can be more cost effective and/or aesthetically appealing. Conventional dual band and/or dual mode alternatives, such as the well known Thuraya, Iridium and/or Globalstar dual mode satellite and/or terrestrial radiotelephone systems, may duplicate some components, which may lead to increased cost, size and/or weight of the radioterminal.

U.S. Pat. No. 6,684,057 issued Jan. 27, 2004, to the present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite radioterminal frequency can be reused terrestrially by an ancillary terrestrial network even within the same satellite cell, using interference cancellation techniques. In particular, the satellite radioterminal system according to some embodiments of U.S. Pat. No. 6,684,057 includes a space-based component that is configured to receive wireless communications from a first radioterminal in a satellite footprint over a satellite radioterminal frequency band, and an ancillary terrestrial network that is configured to receive wireless communications from a second radioterminal in the satellite footprint over the satellite radioterminal frequency band. The space-based component also receives the wireless communications from the second radioterminal in the satellite footprint over the satellite radioterminal frequency band as interference, along with the wireless communications that are received from the first radioterminal in the satellite footprint over the satellite radioterminal frequency band. An interference reducer is responsive to the space-based component and to the ancillary terrestrial network that is configured to reduce the interference from the wireless communications that are received by the space-based component from the first radioterminal in the satellite footprint over the satellite radioterminal frequency band, using the wireless communications that are received by the ancillary terrestrial network from the second radioterminal in the satellite footprint over the satellite radioterminal frequency band.

United States Patent Application Publication No. 2003/0054761 A1, published Mar. 20, 2003 to the present inventor Karabinis and entitled Spatial Guardbands for Terrestrial Reuse of Satellite Frequencies, the disclosure of which is hereby incorporated herein by reference in its entirety as if set forth fully herein, describes satellite radioterminal systems that include a space-based component that is configured to provide wireless radioterminal communications in a satellite footprint over a satellite radioterminal frequency band. The satellite footprint is divided into a plurality of satellite cells, in which satellite radioterminal frequencies of the satellite radioterminal frequency band are spatially reused. An ancillary terrestrial network is configured to terrestrially reuse at least one of the ancillary radioterminal frequencies that is used in a satellite cell in the satellite footprint, outside the cell and in some embodiments separated therefrom by a spatial guardband. The spatial guardband may be sufficiently large to reduce or prevent interference between the at least one of the satellite radioterminal frequencies that is used in the satellite cell in the satellite footprint, and the at least one of the satellite radioterminal frequencies that is terrestrially reused outside the satellite cell and separated therefrom by the spatial guardband. The spatial guardband may be about half a radius of a satellite cell in width.

United States Patent Application Publication No. US 2003/0054815 A1, published Mar. 20, 2003 to the present inventor Karabinis, and entitled Methods and Systems for Modifying Satellite Antenna Cell Patterns in Response to Terrestrial Reuse of Satellite Frequencies, the disclosure of which is hereby incorporated herein by reference in its entirety as if set forth fully herein, describes that space-based wireless radioterminal communications are provided in a satellite footprint over a satellite radioterminal frequency band. The satellite footprint is divided into satellite cells in which satellite radioterminal frequencies of the satellite radioterminal frequency band are spatially reused. At least one of the satellite radioterminal frequencies that is assigned to a given satellite cell in the satellite footprint is terrestrially reused outside the given satellite cell. A radiation pattern of at least the given satellite cell is modified to reduce interference with the at least one of the satellite radioterminal frequencies that is terrestrially reused outside the given satellite cell.

Accordingly, a mobile radioterminal may be configured to communicate with a space-based component of a satellite communications system (i.e., a satellite) and/or an ancillary terrestrial component of an associated ancillary terrestrial network. When communicating with a space-based component and/or an ancillary terrestrial component, an orientation of an antenna of the mobile radioterminal may change relative to the space-based component, i.e. satellite, and/or the ancillary terrestrial component base station as the mobile radioterminal moves. Accordingly, communications between the mobile radioterminal and the space-based component and/or the ancillary terrestrial component base station may be subject to undesired fading as the mobile radioterminal moves during the communication.

SUMMARY

According to embodiments of the present invention, a communications device may include a plurality of antenna elements, an ancillary control receiver, and a primary receiver. The plurality of antenna elements may provide respective fixed beams, and the ancillary control receiver may be coupled to each of the antenna elements. Moreover, the ancillary control receiver may be configured to measure a signal strength from each of the antenna elements and to select one of the antenna elements responsive to the measured signal strengths. The primary receiver may be configured to receive communications using the selected antenna element. As used herein, measuring a signal strength may include, for example, measuring an amplitude of a signal received at an antenna element, measuring a quality of a signal received at an antenna element, and/or measuring an error rate (such as a bit error rate) of a signal received at an antenna element. Moreover, the ancillary control receiver may be configured to sequentially measure a signal strength from each of the antenna elements.

By measuring (i.e. sampling) the signal strengths sequentially (and not in parallel), the ancillary control receiver can be implemented using a single channel receiver as opposed to a multi-channel receiver. Moreover, communications devices according to embodiments of the present invention may be implemented, for example, with frequency division duplexing/multiple access (FDMA), time division duplexing/multiple access (TDMA), and/or code division duplexing/multiple access (CDD/CDMA) air interfaces, using either time division duplexing (TDD) or frequency division duplexing (FDD) with any of the above schemes, wherein the mapping of gain/phase and/or complex baseband weights from receive to transmit frequencies, normally a necessity for FDD, may not be required.

In addition, an RF receiver switch may be provided between the primary receiver and the plurality of antenna elements, and the RF receiver switch may be configured to couple the selected antenna element to the primary receiver and to decouple non-selected antenna elements from the primary receiver. Moreover, the plurality of antennas may include n antenna elements with n>1, and the ancillary control receiver may be configured to select m<n of the n antenna elements, where m may be greater than 1. In addition, the RF receiver switch may be configured to decouple m-n non-selected antenna elements from the primary receiver.

The communications device may also include a transmitter configured to transmit communications using at least one of the antenna elements, and more particularly, using the selected antenna element. In addition, an RF transmitter switch may be provided between the transmitter and the plurality of antenna elements, with the RF transmitter switch being configured to couple the selected antenna element to the transmitter and to decouple non-selected antenna elements from the transmitter. Moreover, the primary receiver and the transmitter may be provided in a transceiver, the ancillary control receiver may be a single channel receiver separate from the primary receiver, and/or the ancillary control receiver may operate asynchronously with respect to the primary receiver.

Moreover, the ancillary control receiver may be based on a simplified version of the primary receiver. Accordingly, the ancillary control receiver may be implemented at relatively low cost based on chipsets developed for the primary receiver, transmitter, and/or transceiver. By providing the ancillary control receiver and the primary receiver separately, the primary receiver may be insulated from changes used in implementing the ancillary control receiver.

According to particular embodiments of the present invention, the primary receiver may receive the communications in accordance with a code division multiple access (CDMA) wireless interface such as a CDMA 1x wireless interface. Moreover, the plurality of antenna elements may include a respective plurality of patch antenna elements with different ones of the patch antenna elements pointing in different azimuthal directions. For example, the plurality of patch antenna elements may be provided on a solid structure such as a pyramid.

Moreover, the antenna elements may be configured such that the fixed beams thereof, collectively, provide 360 degrees of coverage. In addition, the primary receiver may be configured to receive communications from at least one satellite.

According to additional embodiments of the present invention, methods of providing radio communications in a system including a plurality of antenna elements providing respective fixed beams may be provided. In particular, a signal strength from each of the antenna elements may be measured, and one of the antenna elements may be selected responsive to the measured signal strengths. Moreover, communications may be received using the selected antenna element. In addition, signal strengths from the antenna elements may be sequentially measured.

In addition, the selected antenna element may be coupled to a primary receiver, and non-selected antenna elements may be decoupled from the primary receiver. More particularly, the plurality of antenna elements may include n antenna elements with n>1, selecting one of the antenna elements may include selecting a single one of the n antenna elements, and decoupling non-selected antenna elements may include decoupling n-1 non-selected antenna elements from the primary receiver.

Communications may also be transmitted using at least one of the antenna elements. Moreover, the communications may be transmitted using the selected antenna element. For example, transmitting the communications may include coupling the selected antenna element to a transmitter and decoupling non-selected antenna elements from the transmitter.

Measuring a signal strength from each of the antenna elements may include measuring the signal strength using a single channel receiver. Measuring a signal strength from each of the antenna elements may include measuring the signal strength using an ancillary control receiver, receiving communications using the selected antenna element may include receiving communications using a primary receiver, and the ancillary control receiver may be separate from the primary receiver.

Measuring a signal strength from each of the antenna elements may be performed asynchronously with respect to receiving communications using the selected antenna element. Receiving communications using the selected antenna element may include receiving communications in accordance with a code division multiple access (CDMA) wireless interface. For example, the code divisional multiple access wireless interface may include a CDMA 1x wireless interface.

The plurality of antenna elements may include a respective plurality of patch antenna elements with different ones of the patch antenna elements pointing in different azimuthal directions. For example, the plurality of patch antenna elements may be provided on a solid structure, and the solid structure may have a pyramid shape. Moreover, the antenna elements may be configured such that the fixed beams thereof provide 360 degrees of coverage. Receiving communications using the selected antenna element may include receiving communications from at least one satellite.

Selecting one of the antenna elements responsive to the measured signal strengths may include selecting a plurality of n antenna elements (with n>1), and receiving communications using the selected antenna element may include combining signals from the plurality of n selected antenna elements to provide diversity reception. More particularly, selecting one of the antenna elements may further include generating a list of the antenna elements ordered according to the measured signal strengths, and selecting the plurality of n selected antenna elements according to the ordered list. Moreover, the list of the antenna elements may be ordered according to averages of signal qualities from each of the antenna elements. For example, the averages of signal qualities may be determined by recursive digital filtering and/or by non-recursive, block filtering.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap in frequency, but that there may be some areas of non-overlap, for example at a band end(s). "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

Mobile satellite and/or terrestrial communication systems may perform with more link margin, to offer improved performance, when the gain of the user terminal's antenna towards a satellite or terrestrial base station is increased and/or maximized. When the user terminal is mobile (as in a vehicle mounted antenna), however, and the direction towards the satellite or terrestrial base station is unknown, it may be difficult to orient the peak antenna gain of the mobile terminal towards the satellite unless some form of intelligent, and/or adaptive, beam steering is used. According to embodiments of the present invention, low cost systems and methods of electronic beam steering, suitable for use with signals employing pilot signals, such as CDMA 1x, may be provided.

Adaptive beam steering can be either mechanical and/or electronic. Electronic beam steering may provide an advantage of reducing moving parts and may provide a potential to be less expensive, for example, if high volume components can be used. In both mechanical and/or electronic steering, a feedback mechanism may exist which estimates the satellite's direction with respect to the antenna and steers the antenna using available degrees of freedom.

Figure 1:
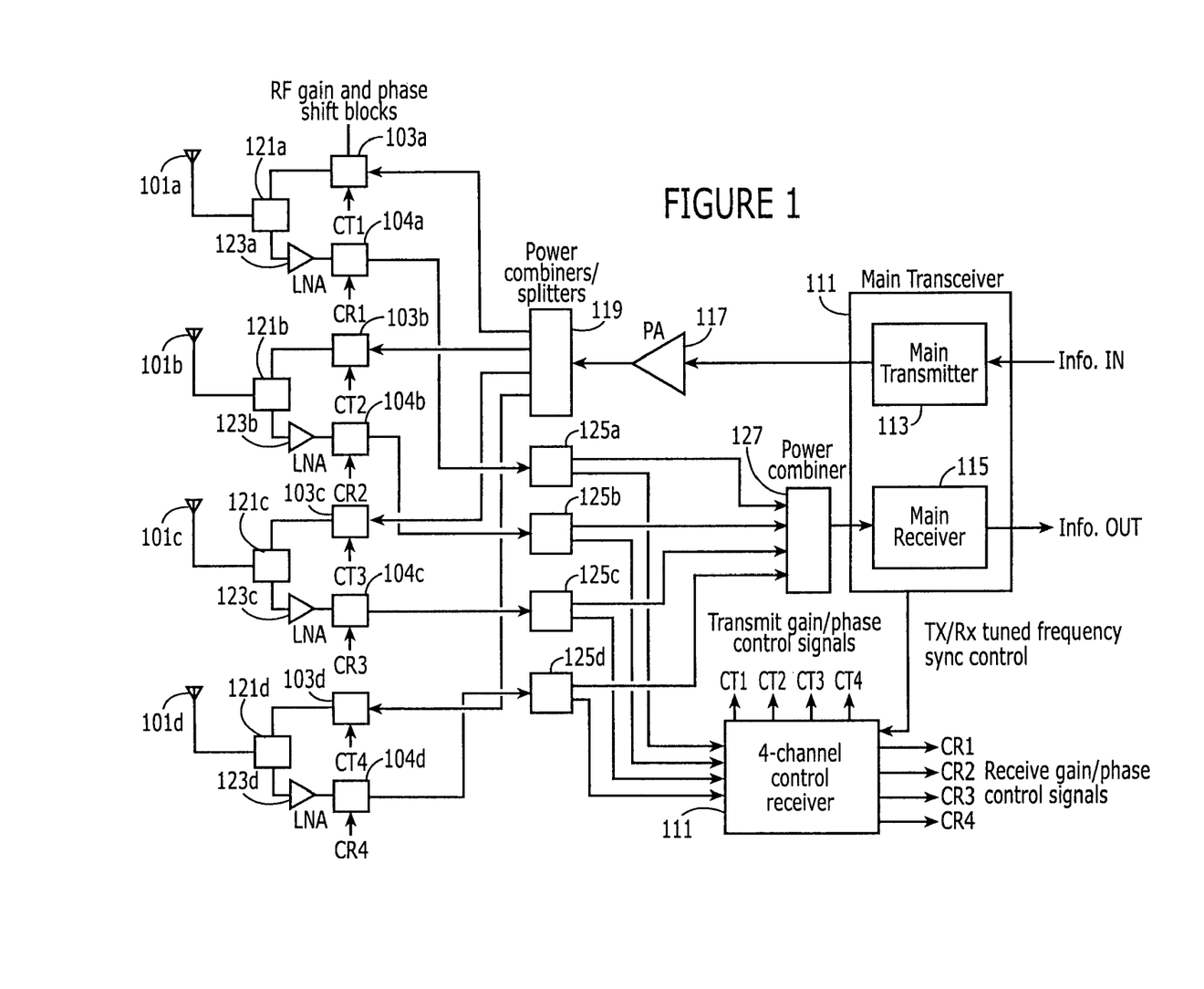
FIG. 1 is a block diagram illustrating an adaptive phase array transceiver using an ancillary control receiver and gain/phase control at radio frequency (RF).

In electronic beam steering, an adaptive phased array including antenna elements 101a-d may be implemented where an RF gain and phase (in an analog implementation) and/or complex baseband digital weights (in a digital implementation) of antenna array elements are chosen such that the composite array pattern has its peak gain oriented towards the antenna. FIG. 1 illustrates a transceiver architecture employing RF gain/phase control using control blocks 103a-d for transmission and 104a-d for reception, and an ancillary control receiver 111 to derive optimal gain/phase-shift values which may then be applied to the corresponding control blocks 103a-d and/or 1-4a-d. Improved and/or optimal weights for the receive mode may be derived using optimization criteria such as minimum mean squared error (MMSE) in conjunction with a known pilot signal. The architecture employing complex baseband weights may be similar, with the exception that the weights may be formed digitally in the complex baseband domain.

The main transceiver 111 may thus include a main transmitter 113 and a main receiver 115. Accordingly, a transmission path(s) may be provided from the main transmitter 113 through the power amplifier 117, the power splitter 119, the transmit control blocks 103a-d, and the diplexers 121a-d to the respective antenna elements 101a-d. A reception path(s) may be provided from the antenna elements 101a-d through the respective diplexers 121a-d, the low noise amplifiers 123a-d, and the receive control blocks 104a-d to the power splitters 125a-d. The receive signal from each antenna element 101a-d is provided from the respective power splitter 125a-d to the power combiner 127 and to the ancillary control receiver 111. The output of the power combiner 127 is provided to the main receiver 115. The ancillary control receiver 111 generates the transmit gain/phase control signals CT1-4 and the receive gain/phase control signals CR1-4 that are provided as inputs to the control blocks 103a-d and 104a-d.

While the approach of FIG. 1 may perform well when transmission and reception are at the same frequency, such as in time division duplexing (TDD), this approach may be difficult to apply to frequency division duplexing (FDD) because this approach involves a mapping of the gain/phase or complex weights from the receive frequency to the transmit frequency. The approach of FIG. 1 may also require accurate gain and phase calibration of the receive and transmit chains.

Figure 2:
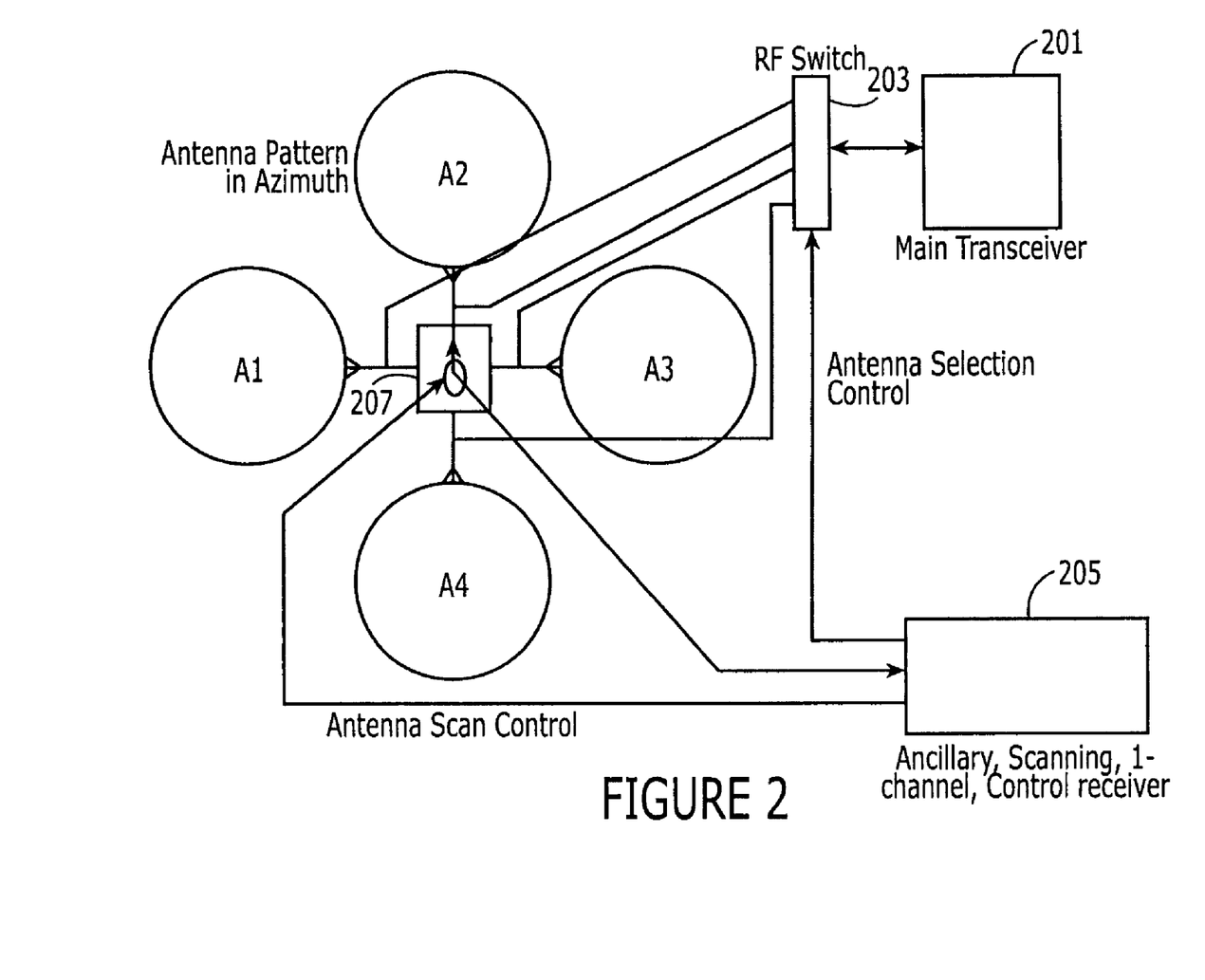
FIG. 2 is a block diagram illustrating communications devices according to embodiments of the present invention.

According to embodiments of the present invention illustrated in FIG. 2, a feedback mechanism may select one of a finite set of antenna elements A1-4 (each with its peak gain pointing in a different direction) instead of selecting adaptive gain/phase or complex weights. Mapping of a gain/phase and/or complex weight from one frequency to another may thus be avoided. While each array element may cover a certain solid angle in azimuth and elevation, the ensemble of all antenna elements A1-A4 may cover all directions of interest. According to embodiments of the present invention, estimating received signal power may be less demanding than calculating optimal weights.

A feedback mechanism according to embodiments of the present invention may sequentially measure signal power received by each antenna element A1-4, and parallel receive chains may not be required. Instead, the antenna elements A1-4 may be connected sequentially to a single receive chain using a signal selector 207, and the power may be measured individually for each using the ancillary receiver 205. In other words, the received power may be sampled at some suitable sampling rate (using signal selector 207) with the sampling rate being determined as follows. The dwell period at each antenna A1-4 may be sufficiently long so as to allow a power measurement of sufficient accuracy to be performed. For a spread spectrum signal, a signal sample of sufficient duration may be collected in order that the signal may be compressed to the information bandwidth to provide that the measured power is dominated by the received signal and not thermal noise internal to the ancillary receiver 205. For many signal formats, including CDMA 1x, a dwell period may be sufficiently small (e.g. under 100 ms) so that typical mobility requirements of tracking angular speed may be met.

Once one of the antenna elements A1-4 providing the highest signal power is identified by the ancillary receiver 205, and suitable time-averaging and hysteresis is applied, the identified antenna element may be connected through radio frequency (RF) switch 203 to the main receiver and transmitter of main transceiver 201 responsive to the ancillary receiver 205. No mapping of gain/phase or complex weights from one frequency to another is required. For receivers with n-fold antenna diversity capability, the n antenna elements with the highest received signal power may be connected to the main receiver. For CDMA 1x, chipsets with n=2 may soon be introduced.

An advantage provided by some embodiments of the present invention is that the main receiver of the main transceiver 201 and the ancillary control receiver 205 (the receiver 205 which scans the antenna elements A1-4 and determines which antenna or set of n antennas is to be connected to the main receiver of the main transceiver 201) may operate at different tuned frequencies, i.e. asynchronously. Adaptive beam steering (which may also be referred to as beam switching) may, therefore, be retrofitted to an existing receiver, transmitter, and/or transceiver. If the beam steering were performed by adaptive gain/phase or complex weights, either (a) an external control receiver may have to be synchronized in tuned frequency to the main receiver, and/or (b) development of the adaptive weights may have to be performed in the main receiver itself requiring a change to the main receiver.

While CDMA 1x is a signal format of particular interest according to embodiments of the present invention, embodiments of the present invention may be applied generally to other signal formats (such as GSM and/or WCDMA), which employ a pilot and/or training signal.

Figure 3A:
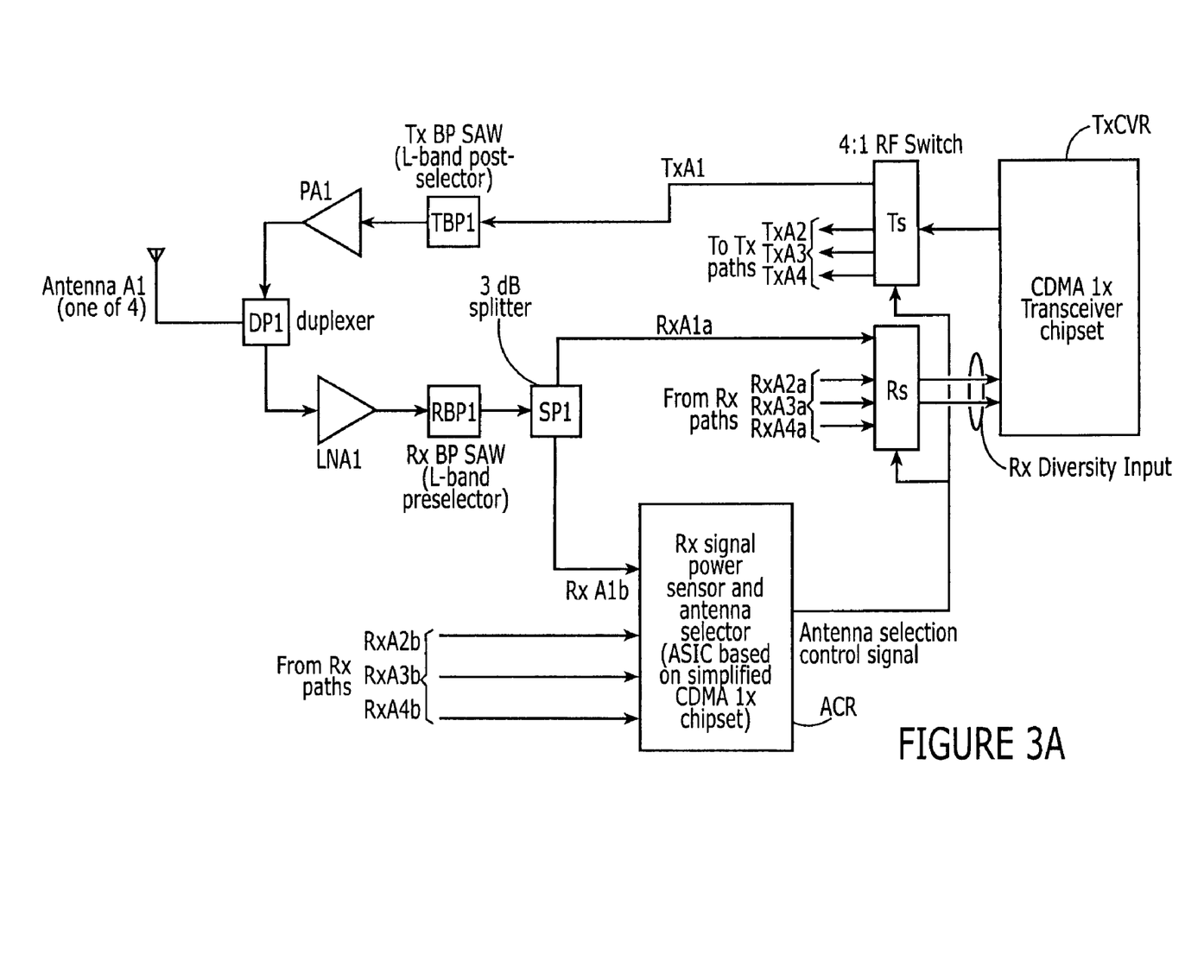
FIGS. 3A-D are block diagrams illustrating communications devices according to additional embodiments of the present invention.
Figure 3B:
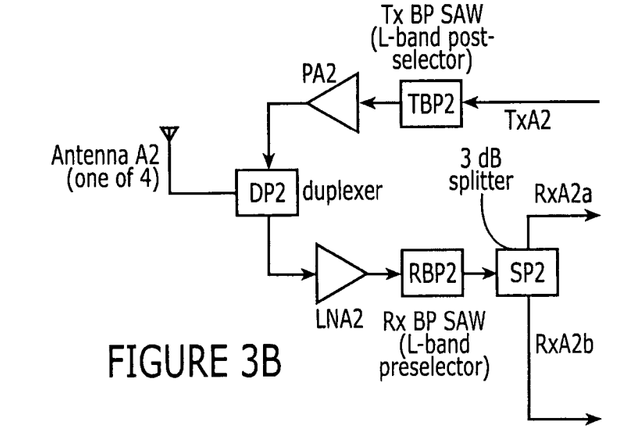
Figure 3C:
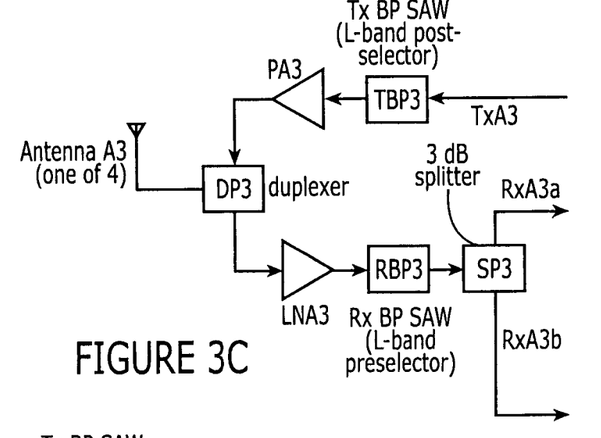
Figure 3D:
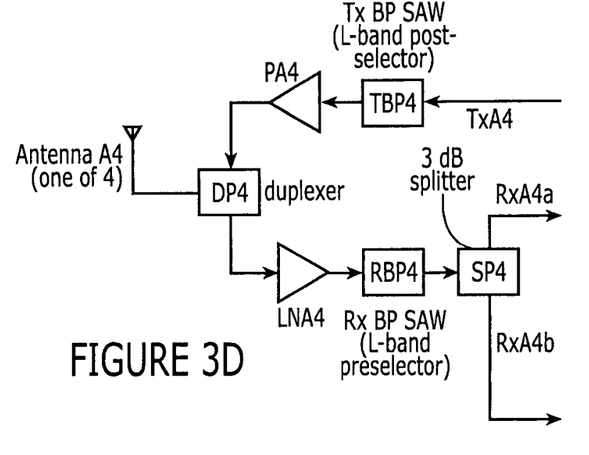

FIGS. 3A-D are block diagrams illustrating communications systems according to embodiments of the present invention. Only one antenna element and its transmit/receive feed network is shown (for antenna element A1, power amplifier PA1, low noise amplifier LNA1, transmit band-pass filter TPB1, duplexer DP1, receive band-pass filter RPB1, and splitter SP1) in FIG. 3A for the sake of clarity. The three other antenna elements (A2-4) and feed networks (including power amplifiers PA2-4, low noise amplifiers LNA2-4, transmit band-pass filters TPB2-4, duplexer DP2-4, receive band-pass filters RPB2-4, and splitters SP2-4) are shown in FIGS. 3B-D. Lined connections between all elements of FIGS. 3A-D have been omitted for the sake of clarity, but these connections will be understood using the signal labels (RxA1a-4a, RxA1b-4b, and TxA1-4) in each of FIGS. 3A-D. Each feed network may include a duplex transceiver employing a common antenna. However, separate transmit and receive antenna elements may be used for each feed network, and the duplexer avoided, according to alternate embodiments of the present invention.

As shown in FIGS. 3A-D, the transceiver Txcvr may include a primary receiver configured to receive communications from one of the antennas A1-4 selected by radio frequency (RF) receiver switch RS, and a transmitter configured to transmit communications from one of the antennas selected by RF transmitter switch TS. The feed network for antenna A1 includes a transmission path from a respective output of the transmit switch TS through transmit band-pass filter TBP1, power amplifier PA1, and duplexer DP1 to the antenna A1. The feed network for antenna A1 also includes a receive path from the antenna A1 through the duplexer DP1, the low noise amplifier LNA1, the receive band-pass filter RBP1, and splitter SP1 to a respective input of the receive switch RS. In addition, the feed network for antenna A1 includes a receive path from the antenna A1 through the duplexer DP1, the low noise amplifier LNA1, the receive band-pass surface acoustic wave filter RBP1, and power splitter SP1 to a respective input of the ancillary control receiver ACR.

The feed network for antenna A2 includes a transmission path from a respective output of the transmit switch TS through transmit band-pass filter TBP2, power amplifier PA2, and duplexer DP2 to the antenna A2. The feed network for antenna A2 also includes a receive path from the antenna A2 through the duplexer DP2, the low noise amplifier LNA2, the receive band-pass filter RBP2, and splitter SP2 to a respective input of the receive switch RS. In addition, the feed network for antenna A2 includes a receive path from the antenna A2 through the duplexer DP2, the low noise amplifier LNA2, the receive band-pass surface acoustic wave filter RBP2, and power splitter SP2 to a respective input of the ancillary control receiver ACR.

The feed network for antenna A3 includes a transmission path from a respective output of the transmit switch TS through transmit band-pass filter TBP3, power amplifier PA3, and duplexer DP3 to the antenna A3. The feed network for antenna A3 also includes a receive path from the antenna A3 through the duplexer DP3, the low noise amplifier LNA3, the receive band-pass filter RBP3, and splitter SP3 to a respective input of the receive switch RS. In addition, the feed network for antenna A3 includes a receive path from the antenna A3 through the duplexer DP3, the low noise amplifier LNA3, the receive band-pass surface acoustic wave filter RBP3, and power splitter SP3 to a respective input of the ancillary control receiver ACR.

The feed network for antenna A4 includes a transmission path from a respective output of the transmit switch TS through transmit band-pass filter TBP4, power amplifier PA4, and duplexer DP4 to the antenna A4. The feed network for antenna A4 also includes a receive path from the antenna A4 through the duplexer DP4, the low noise amplifier LNA4, the receive band-pass filter RBP4, and splitter SP4 to a respective input of the receive switch RS. In addition, the feed network for antenna A4 includes a receive path from the antenna A4 through the duplexer DP4, the low noise amplifier LNA4 the receive band-pass surface acoustic wave filter RBP4, and power splitter SP4 to a respective input of the ancillary control receiver ACR.

The feed networks for each of the antennas A2-4 are similarly coupled to respective transmit switch TS outputs, receive switch RS inputs, and ancillary control receiver ACR inputs as indicated by the transmit and receive signals TxA1-4, RxA1a-4a, and RxA1b-4b. Accordingly, each of the antennas A1-4 is provided with a respective transmission path from a respective output of the transmit switch TS, and with a respective receive path to respective inputs of the receive switch RS and ancillary control receiver ACR.

As shown in FIGS. 3A-D, the ancillary control receiver ACR selects at least one of the plurality of antennas A1-4 for communications using transceiver Txcr, for example, using a comparison of signal strengths and/or signal quality as discussed in greater detail below. The at least one antenna selected by the ancillary control receiver ACR may be communicated from the ancillary control receiver ACT to the transmit and receive switches TS and RS as an antenna selection control signal. Responsive to the antenna selection control signal, the transmit and receive switches TS and RS may couple the at least one selected antenna to the primary receiver and transmitter of the transceiver Txcvr using the respective feed network(s).

According to some embodiments of the present invention, a single antenna may be selected for transmission and reception. For example, a single antenna providing a greatest measured signal strength may be selected by the ancillary control receiver. Accordingly, the single antenna providing the greatest signal strength may be coupled to the transceiver Txcvr through the receive switch RS and the transmit switch TS, and transmit and receive switches TS and RS may decouple other antennas from the transceiver Txcvr. In an alternative, two or more antennas may be selected for reception, and the primary receiver of the transceiver Txcvr may perform diversity reception operations to provide further improvement of reception. For example, the two antennas providing the two highest measured signal strengths may be selected by the ancillary control receiver, and signals from the other (non-selected) antennas may be decoupled from the transceiver Txcvr.

In the example of FIGS. 3A-D, each of the antennas A1-4 may provide both transmission and reception. In an alternative, separate transmit and receive antennas may be provided so that duplexers are not required. For example, the antenna A1 may be replaced with a transmit antenna coupled to power amplifier PA and a separate receive antenna coupled to low noise amplifier LNA, and the duplexer DP1 may be eliminated. Moreover, associated transmit and receive antennas may be oriented in a same direction for communication with a same satellite. Accordingly, a transmit antenna may be selected based on signal strength and/or quality provided by the associated receive antenna.

The outputs of the low noise amplifiers (LNA's) of each feed network may be fed to an ancillary control receiver (ACR) including a single-channel scanning receiver which is connected to each antenna element sequentially for a dwell time $t_{dwell}$. As mentioned above, the dwell time should be sufficiently long to allow the ancillary control receiver ACR to acquire the receiver carrier, i.e. achieve sufficient time and frequency synchronization to perform a reliable measurement of the received signal power. For CDMA 1x, the dwell time may correspond to a time required to acquire the pilot channel, which has no data modulation but is spread to the full channel bandwidth of approximately 1.23 MHz by means of known, PN short codes, whose repetition period may be 26.7 ms. Each base station, or spotbeam in a satellite adaptation, may transmit a unique time offset of a common short code.

An ancillary control receiver according to embodiments of the present invention may operate as follows.
1. The ancillary control receiver ACR selects a particular antenna element receive feed from the set of all feeds (i.e., RxA1$b$-4$b$), corresponding to antennas A1-A4.
2. The single-channel ancillary control receiver ACR is tuned to a frequency known to correspond to a forward control channel. Alternatively, it may scan though a list of frequencies that may contain a forward control channel. Once a forward control channel is found, the single-channel ancillary control receiver ACR acquires the pilot channel, as described above, and performs an average power measurement over a predetermined period, say $t_{meas}$.
3. The ancillary control receiver ACR then sequentially selects each of the other antenna receive feeds and repeats step 2 for each feed. The time to execute steps 1-3 for each of the antenna receive feeds (assuming that the frequency of the forward control channel is known) may be $t_{dwell}$, as described above.
4. By means of steps 1-3 a table may be constructed of power measurements for each antenna A1-4. A time averaging may be performed of each table using a suitable lowpass digital filter. For example, a 1-pole recursive filter, may be given by:

$Y(n)=Y(n-1)+K*X(n)$,

Where Y(n) is the running average for sample index n (the current measurement),
Y(n−1) is the value of Y after the previous measurement,
X(n) is the new measurement for sample index n (the current measurement), and
K is a suitable constant that determines the response time of the filter.
Alternatively, block averaging of N samples may be performed.
5. Every, $t_{adjust\_look\_angle}$ seconds, a decision may be taken whether the antenna feed connected to the main transceiver Txcvr should be changed. This decision, for example, may be based on (a) the highest value of the average power calculated in step 4, and (b) a suitable hysteresis function with the aim to reduce switching jitter when the average powers for two antennas are relatively close. An example of such a hysteresis function may be expressed in Boolean logic as follows:

IF (NEW_HIGHEST_POWER-OLD_HIGHEST_POWER).GT.(X)) THEN SWITCH TO NEW FEED, ELSE (KEEP_OLD_FEED),

Where X represents the degree of hysteresis. A typical value of X may be approximately 5 dB. The meaning of the Boolean variables are as suggested by their names.

With a short code length of 26.7 ms, for example, the following may provide acceptable time plan variables.

| | |
|---|---|
| $t_{meas}$ = | 54 ms (time to perform power measurements on 2 repetitions of the short code) |
| $t_{dwell}$ = | 100 ms (net time to acquire forward carrier and perform power measurements for one antenna) |
| time to scan 4 antennas = | $4*t_{dwell}$ 400 ms |
| $t_{adjust\_look\_angle}$ = | 800 ms (look angle reviewed once every 2 complete scans of the antenna elements) |

A readjustment of the array beam every 800 ms may be sufficient to track most vehicular mobility requirements. In applications requiring more rapid tracking of the vehicle's angular motion, parallel ancillary control receivers may be used, where each receiver serves to monitor a subset of the switched antenna elements, including a subset of 1. This allows $t_{adjust\_look\_angle}$ to be reduced as signal strength/quality estimates are developed in parallel for the different subsets of switched antenna elements.

Figure 4A:
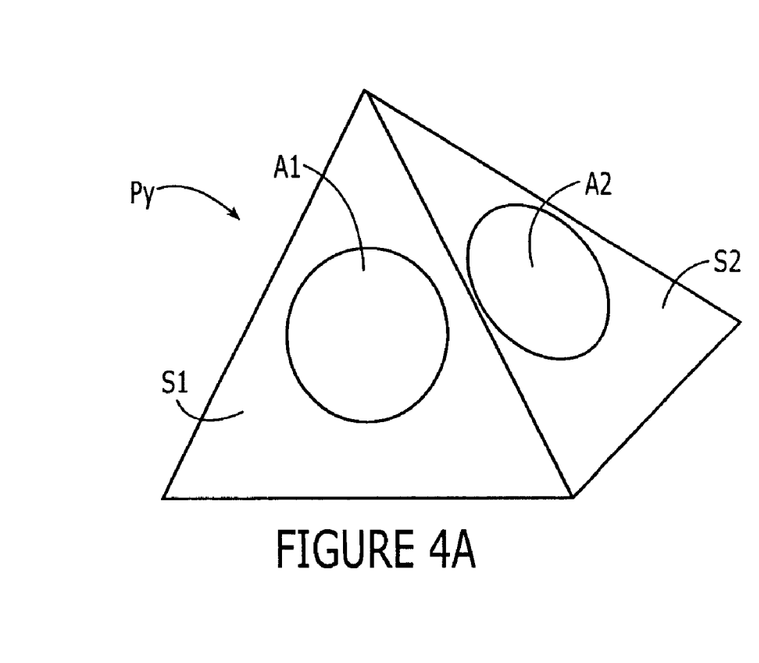
FIGS. 4A-B are perspective and top views of antenna structures according to embodiments of the present invention.
Figure 4B:
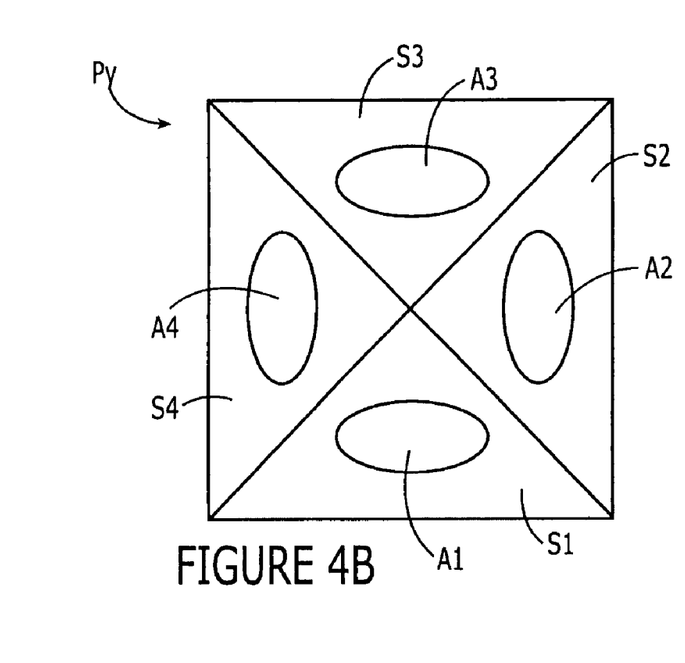

As regards the antenna elements A1-4, for mobile satellite communications using a geosynchronous satellite, it may be advantageous to cover an elevation angle of 10° to 50° and an azimuth of 360°. Patch antennas A1-4 conformal to certain contours may be suitable to create antenna beams meeting the above coverage requirements. For example, a 4-sided pyramid Py with a patch antenna element A1-4 on each of the four sides S1-4 may be provided as illustrated in FIGS. 4A-B. More particularly, azimuthal orientations of the four patch antenna elements A1-4 may be separated by 90 degrees, and each of the patch antenna elements may provide coverage over at least 90 degrees to provide coverage of 360 degrees in the azimuthal direction. In alternatives, other shapes, such as a hemisphere with distinct patch antennas pointing in different azimuthal directions, may be used. In mobile satellite communications, the patch antennas may be circularly polarized.

Figure 5:
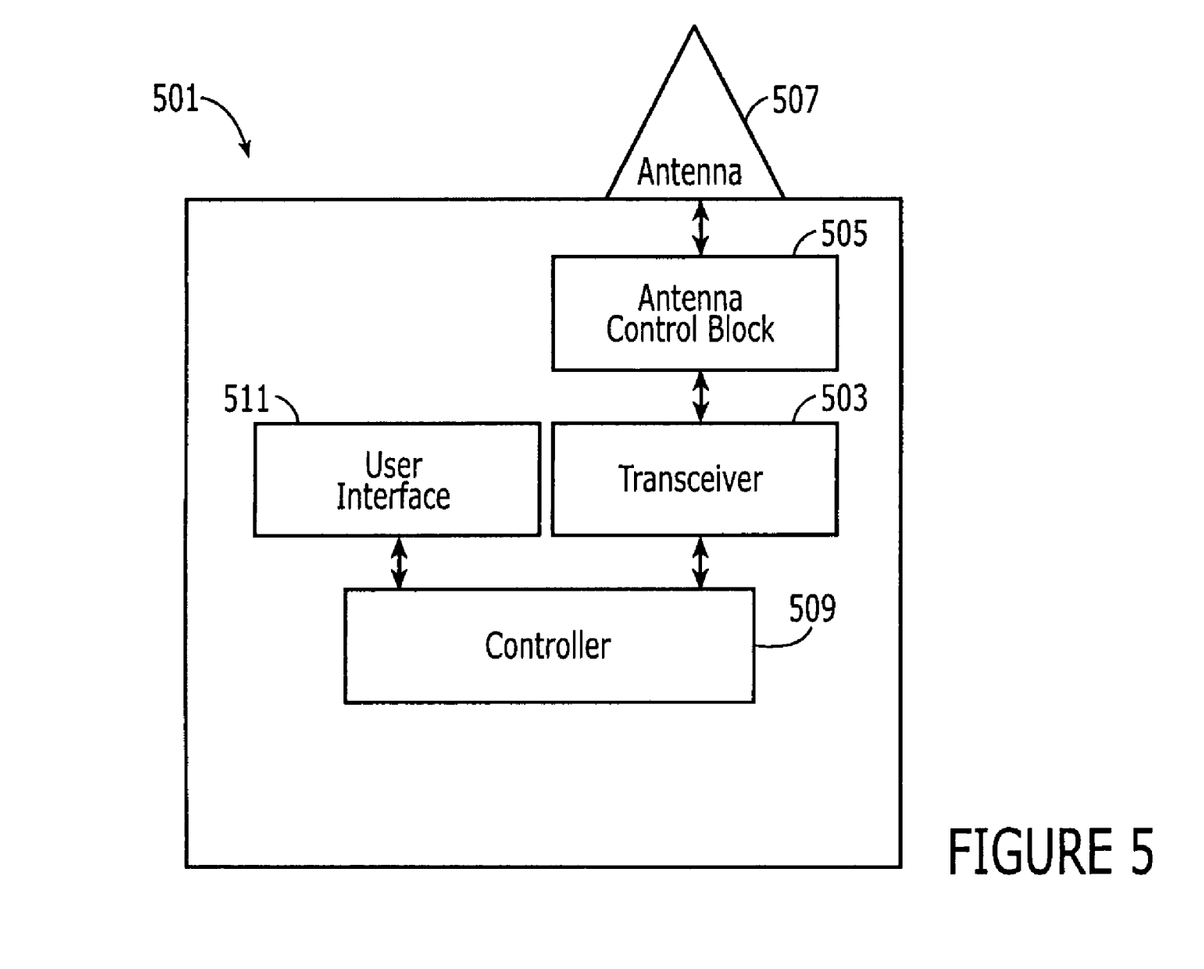
FIG. 5 is a block diagram illustrating a radioterminal according to embodiments of the present invention.

According to some embodiments of the present invention, the elements discussed above with respect to FIGS. 3A-D and 4A-B may be implemented in a mobile radioterminal. The elements discussed above with respect to FIGS. 3A-D and 4A-B may be implemented, for example, in a mobile radioterminal 501 as illustrated in FIG. 5. The mobile radioterminal 501 may include a transceiver 503, an antenna control block 505, an antenna assembly 507, a controller 509, and a user interface 511. More particularly, the transceiver 503 may include all functionality of the transceiver Txcvr of FIG. 3A, and the antenna assembly 507 may include the antenna elements A1-4 of FIGS. 3A-D and 4A-B. In addition, the antenna control block may include the ancillary control receiver ACR, the transmitter switch TS, the receive switch RS, the splitters SP1-4, the transmit band-pass filters TBP1-4, the receive band-pass filters RBP1-4, the power amplifiers PA1-4, the low noise amplifiers LNA1-4, and the duplexers DP1-4.

The user interface 511, for example, may include a speaker, a microphone, a keypad, a screen, a touch sensitive display, a pointing device (such as a joystick, arrow keys, a mouse, a track ball, etc.), and/or other user input/output devices. With a speaker and a microphone, for example, the mobile radioterminal 501 may provide the functionality of a radiotelephone or other wireless voice communications device. In addition or in alternatives, the radioterminal 501 may provide the functionality of a data processing, facsimile transmission/reception, data communications, personal digital assistant, a wireless pager, Internet/Intranet access, a Web browser, an organizer, a calendar, a GPS receiver, a laptop/palmtop computer, and or other devices including a radio frequency transceiver.

Moreover, the elements of the radioterminal 501 may be implemented together as a hand-held communications device. In an alternative, elements of the radioterminal 501 may be physically separate with wired, wireless, and/or optical coupling(s) therebetween. By way of example, the radioterminal 501 may be provided in a vehicle such as an automobile with the antenna assembly 507 being provided on an exposed surface (such as a roof, a window, a dashboard ledge, a rear ledge, etc.), and with the controller 509, the transceiver 503, and/or the antenna control block 505 being provided within the dashboard.

The radioterminal 501 may thus provide communications with a space-based component (such as a satellite) of a satellite communications system and/or an ancillary terrestrial component (such as a base station) of an associated ancillary terrestrial network. As an orientation of the antenna assembly 507 changes relative to the space-based component and/or the ancillary terrestrial component, the antenna control block 505 can measure signal strengths for the different antenna elements and vary couplings between the transceiver 503 and different antenna elements as discussed above with respect to FIGS. 3A-D and 4A-B.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A communications device comprising:
   a plurality of antenna elements providing respective fixed beams;
   an ancillary control radio frequency (RF) receiver coupled to each of the antenna elements, the ancillary control RF receiver being configured to measure a signal strength from each of the antenna elements and to select one of the antenna elements responsive to the measured signal strengths using RF signals received at the ancillary control RF receiver from the antenna elements;
   a primary RF receiver configured to receive communications using RF signals received at the primary RF receiver from the selected antenna element; and
   an RF receiver switch between the primary RF receiver and the plurality of antenna elements, the RF receiver switch being configured to couple the selected antenna element to the primary RF receiver and to decouple non-selected antenna elements from the primary RF receiver.

2. A communications device according to claim 1 wherein the plurality of antenna elements comprises n antenna elements with n>1, wherein the ancillary control RF receiver is configured to select a single one of the n antenna elements, wherein the RF receiver switch is configured to decouple n−1 non-selected antenna elements from the primary RF receiver.

3. A communications device according to claim 1 further comprising:
   a radio frequency (RF) transmitter configured to transmit communications using at least one of the antenna elements.

4. A communications device according to claim 3 wherein the radio frequency (RF) transmitter is configured to transmit the communications using the selected antenna element.

5. A communications device according to claim 4 further comprising:
   an RF transmitter switch coupled between the radio frequency (RF) transmitter and the plurality of antenna elements, the RF transmitter switch being configured to couple the selected antenna element to the radio frequency (RF) transmitter and to decouple non-selected antenna elements from the radio frequency (RF) transmitter.

6. A communications device according to claim 5 wherein the primary RF receiver and the RF transmitter are provided in an RF transceiver.

7. A communications device according to claim 1 wherein the ancillary control RF receiver comprises a single channel RF receiver.

8. A communications device according to claim 1 wherein the ancillary control radio frequency (RF) receiver is separate from the primary radio frequency (RF) receiver.

9. A communication device according to claim 1 wherein the ancillary control RF receiver operates asynchronously with respect to the primary RF receiver so that the ancillary control RF receiver and the primary RF receiver operate at a same tuned frequency or at different tuned frequencies.

10. A communications device according to claim 1 wherein the primary RF receiver receives the communications in accordance with a code division multiple access (CDMA) wireless interface.

11. A communications device according to claim 10 wherein the code divisional multiple access wireless interface comprises a CDMA 1x wireless interface.

12. A communications device according to claim 1 wherein the plurality of antenna elements comprise a respective plurality of patch antenna elements with different ones of the patch antenna elements pointing in different azimuthal directions.

13. A communications device according to claim 12 wherein the plurality of patch antenna elements are provided on a solid structure.

14. A communications device according to claim 13 wherein the solid structure comprises a pyramid.

15. A communications device according to claim 1 wherein the antenna elements are configured such that the fixed beams thereof provide 360 degrees of coverage.

16. A communications device according to claim 1 wherein the primary RF receiver is configured to receive communications from at least one satellite and/or at least one terrestrial base station.

17. A communications device according to claim 1 further comprising:
   an RF receiver switch between the primary RF receiver and the plurality of antenna elements, the RF receiver switch being configured to couple a plurality of n selected antenna elements (with n>1) to the primary RF receiver, the primary RF receiver being configured to combine signals from the plurality of n selected antenna elements to provide diversity reception, and the RF switch being configured to decouple non-selected antenna elements from the primary RF receiver while coupling the plurality of n selected antenna elements to the primary RF receiver.

18. A communications system according to claim 17 wherein the ancillary control RF receiver generates a list of the antenna elements ordered according to the measured signal strengths, and wherein the plurality of n selected antenna elements are selected according to the ordered list.

19. A communications system according to claim 18 wherein the list of the antenna elements is ordered according to averages of signal qualities from each of the antenna elements.

20. A communications system according to claim 19 wherein the averages of signal qualities are determined by recursive digital filtering.

21. A communications system according to claim 19 wherein the averages of signal qualities are determined by non-recursive, block filtering.

22. A communications device according to claim 1 wherein the ancillary control RF receiver is configured to sequentially measure a signal strength from each of the antenna elements.

23. A communications device according to claim 1 wherein the primary RF receiver is configured to receive communications using the selected antenna element at the same time that the ancillary control RF receiver measures a signal strength from at least one of the antenna elements.

24. A communications device according to claim 1 wherein the ancillary control RF receiver is configured to measure signal strength using a first tuned frequency and wherein the primary RF receiver is configured to receive communications using a second tuned frequency different than the first tuned frequency.

25. A communications device according to claim 1 wherein the ancillary control RF receiver is configured to measure signal strength using a control channel.

26. A communications device according to claim 1 wherein the ancillary control RF receiver is configured to measure signal strength using a pilot channel having no data modulation.

27. A communications device according to claim 1 wherein a frequency of the RF signals received at the ancillary control RF receiver is unchanged relative to a frequency of respective RF signals at the antennal elements, and wherein a frequency of the RF signals received at the primary RF receiver is unchanged relative to a frequency of respective RF signals received at the selected antenna element.

28. A method of providing radio communications in a system including a plurality of antenna elements providing respective fixed beams, the method comprising:
    measuring a signal strength from each of the plurality of antenna elements using an ancillary control radio frequency (RF) receiver receiving RF signals at the ancillary control RF receiver from the antenna elements;
    selecting one of the antenna elements responsive to the measured signal strengths;
    receiving communications using the selected antenna element and a primary RF receiver using RF signals received at the primary RF receiver from the selected antenna element;
    coupling the selected antenna element through a radio frequency (RF) switch to the primary RF receiver, wherein the radio frequency (RF) switch is between the primary RF receiver and the plurality of antenna elements; and
    decoupling non-selected antenna elements from the primary RF receiver at the radio frequency (RF) switch.

29. A method according to claim 28 wherein the plurality of antenna elements comprises n antenna elements with n>1, wherein selecting one of the antenna elements comprises selecting a single one of the n antenna elements, and wherein decoupling non-selected antenna elements comprises decoupling n−1 non-selected antenna elements from the primary RF receiver.

30. A method according to claim 28 further comprising:
    transmitting communications from a radio frequency (RF) transmitter using at least one of the antenna elements.

31. A method according to claim 30 wherein transmitting communications comprises transmitting the communications from the radio frequency (RF) transmitter through a radio frequency (RF) switch and the selected antenna element wherein the radio frequency (RF) switch is coupled between the radio frequency (RF) transmitter and the plurality of antenna elements.

32. A method according to claim 31 wherein transmitting the communications comprises coupling the selected antenna element to the radio frequency (RF) transmitter and decoupling non-selected antenna elements from the RF transmitter.

33. A method according to claim 28 wherein the ancillary control RF receiver comprises a single channel RF receiver.

34. A method according to claim 28 wherein the ancillary control radio frequency (RF) receiver is separate from the primary radio frequency (RF) receiver.

35. A method according to claim 28 wherein measuring the signal strength using the ancillary control RF receiver is performed asynchronously with respect to receiving communications using the selected antenna element and the primary RF receiver so that the ancillary control RF receiver and the primary RF receiver operate at a same tuned frequency or at different tuned frequencies.

36. A method according to claim 28 wherein receiving communications using the selected antenna element comprises receiving communications in accordance with a code division multiple access (CDMA) wireless interface.

37. A method according to claim 36 wherein the code divisional multiple access wireless interface comprises a CDMA 1x wireless interface.

38. A method according to claim 28 wherein the plurality of antenna elements comprise a respective plurality of patch antenna elements with different ones of the patch antenna elements pointing in different azimuthal directions.

39. A method according to claim 38 wherein the plurality of patch antenna elements are provided on a solid structure.

40. A method according to claim 39 wherein the solid structure comprises a pyramid.

41. A method according to claim 28 wherein the antenna elements are configured such that the fixed beams thereof provide 360 degrees of coverage.

42. A method according to claim 28 wherein receiving communications using the selected antenna element comprises receiving communications from at least one satellite and/or at least one terrestrial base station.

43. A method according to claim 28 wherein selecting one of the antenna elements responsive to the measured signal strengths comprises selecting a plurality of n antenna elements (with n>1), and wherein receiving communications using the selected antenna element comprises combining signals from the plurality of n selected antenna elements to provide diversity reception.

44. A method according to claim 43 wherein selecting one of the antenna elements further comprises generating a list of the antenna elements ordered according to the measured signal strengths, and selecting the plurality of n selected antenna elements according to the ordered list.

45. A method according to claim 44 wherein the list of the antenna elements is ordered according to averages of signal qualities from each of the antenna elements.

46. A method according to claim 45 wherein the averages of signal qualities are determined by recursive digital filtering.

47. A method according to claim 45 wherein the averages of signal qualities are determined by non-recursive, block filtering.

48. A method according to claim 28 wherein measuring a signal strength comprises sequentially measuring a signal strength from each of the antenna elements.

49. A method according to claim 28 receiving communications comprises receiving communications using the selected antenna element at the same time as measuring a signal strength from at least one of the antenna elements.

50. A method according to claim 28 wherein measuring signal strength comprises measuring signal strength using a first tuned frequency and wherein receiving communications comprises receiving communications using a second tuned frequency different than the first tuned frequency.

51. A method according to claim 28 wherein measuring signal strength comprises measuring signal strength using a control channel.

52. A method according to claim 28 wherein measuring signal strength comprises measuring signal strength using a pilot channel having no data modulation.

53. A method according to claim 28 wherein a frequency of the RF signals received at the ancillary control RF receiver is unchanged relative to a frequency of respective RF signals at the antennal elements, and wherein a frequency of the RF signals received at the primary RF receiver is unchanged relative to a frequency of respective RF signals received at the selected antenna element.

* * * * *